(12) United States Patent
Allen et al.

(10) Patent No.: US 6,553,944 B1
(45) Date of Patent: Apr. 29, 2003

(54) WRIST WORN LEASH RETAINING DEVICE

(76) Inventors: Virginia A. Allen, 1721 Lorraine Pl., Plano, TX (US) 75074; Greta B. Allen, 1723 Royal Dr., Las Cruces, NM (US) 88011

( * ) Notice: Subject to any disclaimer, the term of this patent is extended or adjusted under 35 U.S.C. 154(b) by 0 days.

(21) Appl. No.: 10/178,687

(22) Filed: Jun. 24, 2002

Related U.S. Application Data

(60) Provisional application No. 60/302,759, filed on Jul. 3, 2001.

(51) Int. Cl.[7] .......................... A01K 27/00; A62B 35/00
(52) U.S. Cl. ....................................... 119/769; 119/770
(58) Field of Search ................................ 119/769, 770, 119/772, 792

(56) References Cited

U.S. PATENT DOCUMENTS

| | | | | |
|---|---|---|---|---|
| 4,729,345 A | * | 3/1988 | Anderson | 119/770 |
| 4,751,896 A | * | 6/1988 | Miley | 119/770 |
| 4,765,279 A | * | 8/1988 | Klickstein | 119/770 |
| 5,699,555 A | * | 12/1997 | Schunter | 119/770 |
| 5,839,394 A | | 11/1998 | Dickison | 119/795 |
| 5,842,444 A | | 12/1998 | Perrulli | 119/770 |
| 5,915,336 A | | 6/1999 | Watson | 119/797 |
| 5,950,569 A | | 9/1999 | Perrulli | 119/770 |
| 6,082,308 A | | 7/2000 | Walter | 119/769 |
| 6,095,093 A | * | 8/2000 | Kisko et al. | 119/770 |
| 6,449,815 B1 | * | 9/2002 | Spiller | 119/792 |

* cited by examiner

Primary Examiner—Charles T. Jordan
Assistant Examiner—Elizabeth Shaw
(74) Attorney, Agent, or Firm—Sturm & Fix LLP

(57) ABSTRACT

A leash retaining device (10) for controlling a dog leash (100) in a hands free manner wherein, the device (10) includes an elongated wrist strap member (20) having a pair of cooperating fasteners (21) (22) adapted to form a wrist encircling loop opening (23) and a relatively short leash strap member (30) the opposite ends of which (34) (36) are also provided with cooperating fasteners (31) (32) adapted to form a leash encircling opening (33) for engaging the looped proximal end (101) of a dog leash in a hands free fashion.

19 Claims, 1 Drawing Sheet

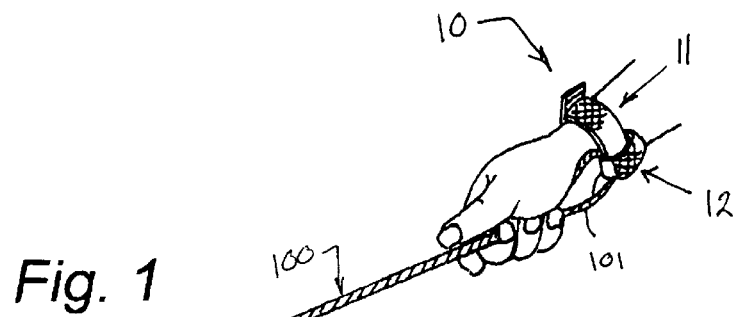
Fig. 1
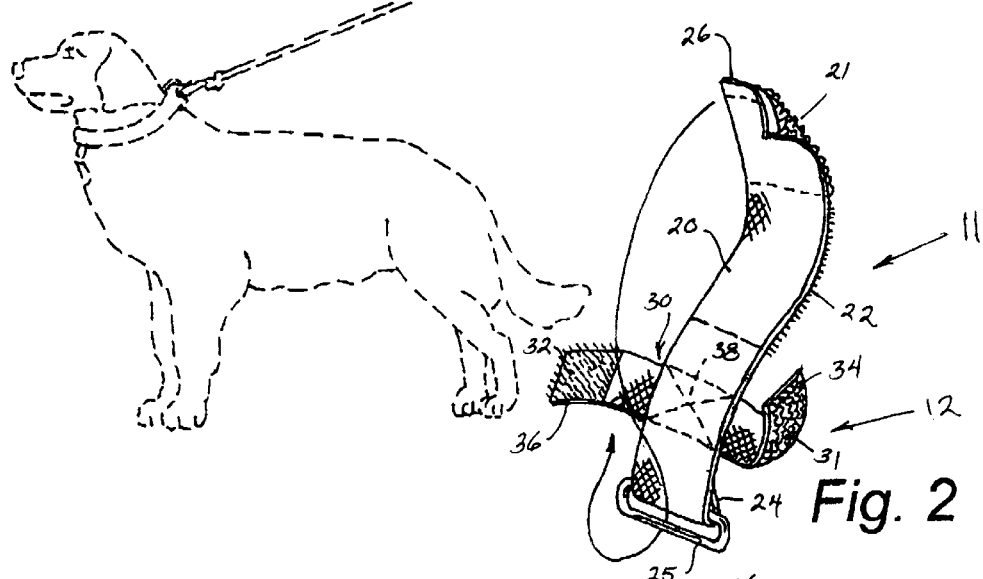
Fig. 2
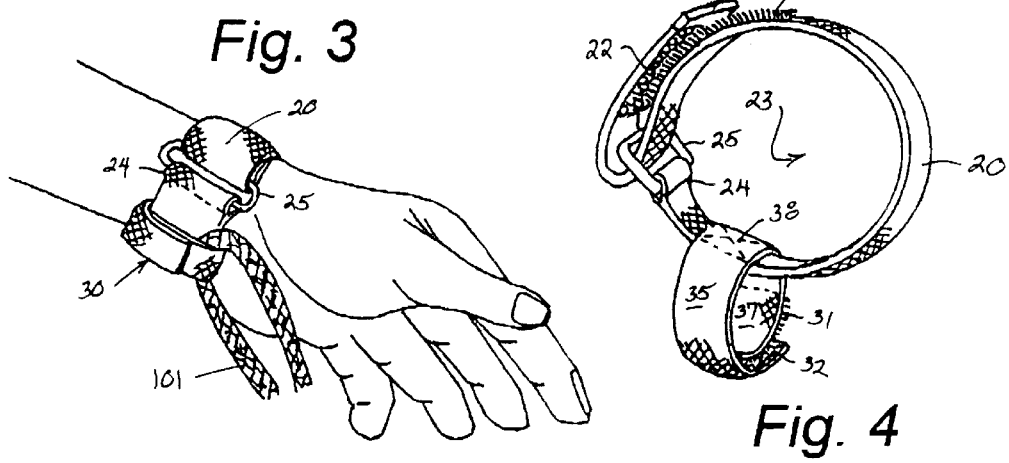
Fig. 3
Fig. 4

WRIST WORN LEASH RETAINING DEVICE

CROSS REFERENCE TO RELATED APPLICATIONS

This invention was the subject matter of Document Disclosure Program Registration No. 60/302,759, filed in the United States Patent and Trademark Office on Jul. 3, 2001.

BACKGROUND OF THE INVENTION

1. Field of the Invention

The present invention relates to the field of dog leash constructions in general and in particular to a hands free dog leash retaining device that is releasably secured to the user's person.

2. Description of Related Art

As can be seen by reference to the following U.S. Pat. Nos. 5,839,394; 5,915,336; 6,082,308; 5,842,444; and, 5,950,569, the prior art is replete with myriad and diverse dog leash related arrangements.

While all of the aforementioned prior art constructions are more than adequate for the basic purpose and function for which they have been specifically designed, they are uniformly deficient with respect to their failure to provide a simple, efficient, and practical hands free dog leash retaining device.

As most dog owners are all too well aware, at least one of their hands will always be occupied with the task of maintaining control of the dog leash while walking their pet thereby making other tasks such as carrying packages or dialing a cell phone very difficult, if not impossible to accomplish.

As a consequence of the foregoing situation, there has existed a longstanding need among dog owners for a new and improved hands free dog leash retaining device which is worn on their wrist and adapted to releasably engage the looped handle on the proximal end of a dog leash; and, the provision of such an arrangement is the stated objective of the present invention.

BRIEF SUMMARY OF THE INVENTION

Briefly stated, the hands free leash retaining device that forms the basis of the present invention comprises in general a wrist engaging unit and a leash engaging unit wherein the wrist engaging unit is adapted to releasably engage the user's wrist and the leash engaging unit is fixedly secured to the wrist engaging unit to form a generally cruciform configuration and is adapted to releasably engage the looped handle on the proximal end of a dog leash.

As will be explained in greater detail further on in the specification, both the wrist engaging unit and the leash engaging unit include strap members arranged in a generally cruciform configuration relative to one another wherein, each of the strap members is further provided with a pair of cooperating fasteners adapted to form loop openings that captively yet releasably surround the user's wrist and the looped handle of a dog leash respectively so that both of the user's hands are free to perform other functions while still maintaining control over the dog leash.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing the hands free leash retaining device in use;

FIG. 2 is an isolated perspective view of the retaining device showing the wrist and leash engaging units in their disengaged positions;

FIG. 3 is a perspective view showing the retaining device engaged with both the user's wrist and the leash handle; and, FIG. 4 is an isolated perspective view of the retaining device showing the wrist and leash engaging units in their engaged positions.

DETAILED DESCRIPTION OF THE INVENTION

As can be seen by reference to the drawings, and in particular to FIG. 1, the wrist worn leash retaining device that forms the basis of the present invention is designated generally by the reference number 10. The leash retaining device 10 comprises in general a wrist engaging unit 11 and a leash engaging unit 12. These units will now be described in seriatim fashion.

As shown in FIGS. 2 and 4, the wrist engaging unit 11 comprises in general an elongated wrist strap member 20 provided with a pair of cooperating hook and loop fasteners 21 22 which are adapted to releasably engage one another to form an adjustable loop opening 23 that can captively surround a user's wrist.

In the preferred embodiment of the invention illustrated in FIGS. 2 and 4, one end 24 of the wrist strap member 20 is provided with a loop element 25 that is dimensioned to receive the other end 26 of the wrist strap member 20 wherein the other end 26 has one of the cooperating fasteners 21 disposed adjacent the end 26.

In addition, the other cooperating fastener 22 is spaced from the end 26 such that the other or second end 26 of the wrist strap member 20 can pass through the loop element 25 on the first end 24 of the wrist strap member 20 and be folded back against itself to engage the cooperating fasteners 21 22 in a well recognized fashion.

At this juncture, it should be noted that while the cooperating fasteners 21 22 on the wrist strap member 20 are located on and near the second end 26 of the wrist strap member 20 in the preferred embodiment, this invention also contemplates having the cooperating fasteners 21 22 disposed on the opposite sides of the opposed ends 24 26 thereby obviating the need for the loop element 25 on one end 24 of the wrist strap member 20.

Turning now to FIGS. 2 and 4, it can be seen that the leash engaging unit 12 comprises a generally short leash strap member 30 having an intermediate portion 38 which is fixedly secured in a transverse fashion proximately to but spaced from one end 24 of the wrist strap member 20 wherein, the longitudinal axis of the leash strap member 30 is disposed generally perpendicular to the longitudinal axis of the wrist strap member 20.

As can also be seen by reference to FIGS. 2 and 4, the opposite sides 35 37 of the opposite ends 34 36 of the leash strap member 30 are likewise provided with cooperating hook and loop fasteners 31 32 adapted to releasably engage one another to form a loop opening 33 that will releasably yet captively engage the looped proximal end 101 of a dog leash 100.

At this juncture, it should be apparent that the hands free leash retaining device 10 of this invention is quickly and easily employed by first securing the wrist engaging unit 11 around the user's wrist 200 and then releasably engaging the leash engaging unit 12 around the looped proximate end 101 of a dog leash 100.

Now the owner has full use of both hands to accomplish other tasks while still maintaining full and effective control over the dog leash 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A hands free retaining device adapted to releasably engage the proximal looped end of a dog leash wherein the device comprises a wrist engaging unit including an elongated wrist strap member provided with cooperating fasteners adapted to form a wrist encircling loop opening; and, a leash engaging unit attached to said wrist engaging unit and provided with means for captively yet releasably engaging the proximal looped end of a dog leash.

2. The retaining device as in claim 1; wherein, the leash engaging unit includes a relatively short leash strap member having an intermediate portion operatively connected to a selected portion of the wrist strap member.

3. The retaining device as in claim 2; wherein, the intermediate portion of the leash strap member is fixedly secured to a selected portion of the wrist strap member.

4. The retaining device as in claim 3; wherein, the leash strap member has opposite ends provided with cooperating fasteners.

5. The retaining device as in claim 4; wherein, the leash strap member has opposite sides and the cooperating fasteners are disposed on the opposite sides of the opposite ends of the leash strap member.

6. The retaining device as in claim 3; wherein, the wrist engaging unit has a longitudinal axis and the leash engaging unit has a longitudinal axis that is disposed generally perpendicular to the longitudinal axis of the wrist engaging unit.

7. The retaining device as in claim 3; wherein, the wrist strap member has a first end and a second end and the first end is provided with a loop element dimensioned to receive said second end.

8. The retaining device as in claim 7; wherein, the cooperating fasteners on the wrist strap member are disposed in the vicinity of the second end of the wrist strap member.

9. The retaining device as in claim 8; wherein, the leash strap member is secured proximate to but spaced from said first end of the wrist strap member.

10. The retaining device as in claim 1; wherein, the wrist strap member has a first end and a second end and the first end is provided with a loop element dimensioned to receive said second end.

11. The retaining device as in claim 10; wherein, the cooperating fasteners on the wrist strap member are disposed in the vicinity of the second end of the wrist strap member.

12. A hands free retaining device adapted to releasably engage the proximal looped end of a dog leash wherein the device comprises:

a wrist engaging unit including an elongated wrist strap member; and, a leash engaging unit including a relatively short leash strap member attached to said wrist strap member to produce a generally cruciform configuration.

13. The retaining device as in claim 12; wherein, both the wrist strap member and the leash strap member are provided with a pair of cooperating fasteners.

14. The retaining device as in claim 13; wherein, the leash strap member has opposite ends provided with cooperating fasteners.

15. The retaining device as in claim 14; wherein, the leash strap member has opposite sides and one of the cooperating fasteners is provided on one side and the other cooperating fastener is provided on the other side of the leash strap member.

16. The retaining device as in claim 14; wherein, the wrist strap member has a first end and a second end and the cooperating fasteners are provided in the vicinity of the second end of the wrist strap member.

17. The retaining device as in claim 15; wherein, the wrist strap member has a first end and a second end and the cooperating fasteners are provided in the vicinity of the second end of the wrist strap member.

18. The retaining device as in claim 16; wherein, the first end of the wrist strap member is further provided with a loop element dimensioned to receive said second end.

19. The retaining device as in claim 17; wherein, the first end of the wrist strap member is further provided with a loop element dimensioned to receive said second end.

* * * * *